United States Patent
Tokuchi et al.

(10) Patent No.: US 11,868,529 B2
(45) Date of Patent: Jan. 9, 2024

(54) INFORMATION PROCESSING DEVICE AND NON-TRANSITORY COMPUTER READABLE MEDIUM

(71) Applicant: Agama-X Co., Ltd., Tokyo (JP)

(72) Inventors: Kengo Tokuchi, Tokyo (JP); Masahiro Sato, Tokyo (JP)

(73) Assignee: Agama-X Co., Ltd., Tokyo (JP)

( * ) Notice: Subject to any disclaimer, the term of this patent is extended or adjusted under 35 U.S.C. 154(b) by 619 days.

(21) Appl. No.: 16/864,207

(22) Filed: May 1, 2020

(65) Prior Publication Data
US 2021/0181843 A1 Jun. 17, 2021

(30) Foreign Application Priority Data
Dec. 13, 2019 (JP) .................................. 2019-225150

(51) Int. Cl.
G06F 3/01 (2006.01)
G05B 15/02 (2006.01)
G06F 9/54 (2006.01)
G06F 3/048 (2013.01)

(52) U.S. Cl.
CPC ............. *G06F 3/015* (2013.01); *G05B 15/02* (2013.01); *G06F 3/017* (2013.01); *G06F 9/542* (2013.01)

(58) Field of Classification Search
CPC .......... G06F 3/015; G06F 3/017; G06F 9/542; G05B 15/02
See application file for complete search history.

(56) References Cited

U.S. PATENT DOCUMENTS

| | | | | |
|---|---|---|---|---|
| 4,270,848 A | * | 6/1981 | Angenieux | G02B 15/144 359/687 |
| 5,319,747 A | * | 6/1994 | Gerrissen | G06F 3/04817 715/733 |
| 5,765,561 A | * | 6/1998 | Chen | G09B 23/28 600/407 |
| 5,790,104 A | * | 8/1998 | Shieh | G06F 3/0488 345/173 |
| 6,084,594 A | * | 7/2000 | Goto | G06T 19/00 345/9 |

(Continued)

FOREIGN PATENT DOCUMENTS

JP 2002-166050 A 6/2002
JP 2002251234 A 9/2002
(Continued)

OTHER PUBLICATIONS

Japanese Notice of Reasons for Refusal for corresponding JP Application No. 2019225150 dated May 30, 2023, 6 pages.

*Primary Examiner* — Nicholas Augustine
(74) *Attorney, Agent, or Firm* — Hoffman Warnick LLC

(57) ABSTRACT

An information processing device includes a processor configured to operate an operation target according to a first operation mode on a basis of biological information about a user, and operate the operation target according to a second operation mode different from the first operation mode on a basis of the biological information about the user in a case where biological information about the user is being measured and the operation target is not operated according to the first operation mode on the basis of the biological information about the user for a predetermined time or longer.

10 Claims, 7 Drawing Sheets

(56) References Cited

U.S. PATENT DOCUMENTS

| | | | | |
|---|---|---|---|---|
| 6,181,302 B1* | 1/2001 | Lynde | | G01C 21/203 345/9 |
| 6,346,929 B1* | 2/2002 | Fukushima | | G06F 3/017 345/9 |
| RE37,668 E * | 4/2002 | Etoh | | H04N 19/94 382/283 |
| 6,559,813 B1* | 5/2003 | DeLuca | | G09G 5/14 348/E13.058 |
| 6,690,960 B2* | 2/2004 | Chen | | A61B 34/20 600/407 |
| 6,741,223 B2* | 5/2004 | Kobayashi | | G02B 27/0101 345/9 |
| 6,771,294 B1* | 8/2004 | Pulli | | G06F 3/011 715/764 |
| 6,803,928 B2* | 10/2004 | Bimber | | G06F 3/012 715/757 |
| 6,850,252 B1* | 2/2005 | Hoffberg | | H04N 21/475 380/252 |
| 7,046,263 B1* | 5/2006 | Abbott | | G06F 3/011 715/740 |
| 7,055,101 B2* | 5/2006 | Abbott | | G06F 21/00 715/740 |
| 7,058,893 B2* | 6/2006 | Abbott | | G06F 3/016 715/740 |
| 7,058,894 B2* | 6/2006 | Abbott | | G06F 1/163 715/740 |
| 7,062,715 B2* | 6/2006 | Abbott | | G06F 21/00 715/740 |
| 7,073,129 B1* | 7/2006 | Robarts | | H04L 51/212 715/740 |
| 7,076,737 B2* | 7/2006 | Abbott | | G06F 21/606 715/744 |
| 7,080,322 B2* | 7/2006 | Abbott | | G06F 1/163 715/740 |
| 7,089,497 B2* | 8/2006 | Abbott | | G06F 3/0481 715/740 |
| 7,107,539 B2* | 9/2006 | Abbott | | G06F 1/163 715/740 |
| 7,137,069 B2* | 11/2006 | Abbott | | G06F 1/163 715/740 |
| 7,155,456 B2* | 12/2006 | Abbott, III | | G06F 16/487 |
| 7,167,779 B2* | 1/2007 | Kashiwada | | G02B 27/0101 701/1 |
| 7,203,906 B2* | 4/2007 | Abbott | | G06F 3/016 715/708 |
| 7,225,229 B1* | 5/2007 | Abbott | | G06Q 30/02 709/224 |
| 2002/0044152 A1* | 4/2002 | Abbott, III | | G02B 27/017 345/629 |
| 2002/0118232 A1 | 8/2002 | Watanabe et al. | | |
| 2002/0186228 A1* | 12/2002 | Kobayashi | | B60K 37/02 345/633 |
| 2003/0012409 A1* | 1/2003 | Overton | | G06T 7/60 382/103 |
| 2003/0029464 A1* | 2/2003 | Chen | | A61B 90/36 600/429 |
| 2003/0032876 A1* | 2/2003 | Chen | | G09B 23/28 600/407 |
| 2003/0154476 A1* | 8/2003 | Abbott, III | | G06F 16/40 725/37 |
| 2004/0068758 A1* | 4/2004 | Daily | | H04N 21/658 348/E7.071 |
| 2004/0070611 A1* | 4/2004 | Tanaka | | H04N 21/4122 715/757 |
| 2004/0139156 A1* | 7/2004 | Matthews | | G09B 7/00 715/705 |
| 2005/0027186 A1* | 2/2005 | Chen | | A61B 34/20 600/407 |
| 2005/0209828 A1* | 9/2005 | Blosser | | G01S 17/04 702/190 |
| 2006/0178862 A1* | 8/2006 | Chan | | G06F 30/00 703/11 |
| 2006/0277474 A1* | 12/2006 | Robarts | | H04L 51/212 715/745 |
| 2007/0273611 A1* | 11/2007 | Torch | | A61B 3/112 345/8 |
| 2008/0062291 A1* | 3/2008 | Sako | | G02B 27/0093 348/207.99 |
| 2009/0143141 A1* | 6/2009 | Wells | | G07F 17/3239 463/37 |
| 2011/0077548 A1* | 3/2011 | Torch | | A61B 5/165 600/558 |
| 2014/0245785 A1* | 9/2014 | Proud | | G06F 1/163 63/1.13 |
| 2015/0272496 A1* | 10/2015 | Klappert | | H04N 21/42201 600/545 |
| 2015/0351655 A1* | 12/2015 | Coleman | | G16H 50/20 600/595 |
| 2018/0329505 A1 | 11/2018 | Takahashi | | |
| 2019/0324526 A1 | 10/2019 | Suzuki et al. | | |

FOREIGN PATENT DOCUMENTS

| | | |
|---|---|---|
| JP | 2014-71825 A | 4/2014 |
| JP | 2014238695 A | 12/2014 |
| JP | 2015-102650 A | 6/2015 |
| JP | 2015-211705 A | 11/2015 |
| WO | 2017094346 A1 | 6/2017 |
| WO | 2018008226 A1 | 1/2018 |

* cited by examiner

| ID | FIRST STANDARD BRAIN WAVE | OPERATION ITEM |
|---|---|---|
| 1 |  | TURN ON COOLER OF AIR CONDITIONER |
| 2 |  | TURN OFF COOLER OF AIR CONDITIONER |
| ... | ... | ... |

| ID | SECOND STANDARD BRAIN WAVE | OPERATION ITEM |
|---|---|---|
| 1 |  | TURN ON COOLER OF AIR CONDITIONER |
| 2 |  | TURN OFF COOLER OF AIR CONDITIONER |
| ... | ... | ... |

FIG. 6

| ID | USER INFORMATION | FIRST STANDARD BRAIN WAVE | OPERATION ITEM |
|---|---|---|---|
| 1 | USER A | (waveform) | TURN ON COOLER OF AIR CONDITIONER |
| 2 | USER A | (waveform) | TURN OFF COOLER OF AIR CONDITIONER |
| ... | ... | ... | ... |

FIG. 7

| ID | USER INFORMATION | SECOND STANDARD BRAIN WAVE | OPERATION ITEM |
|---|---|---|---|
| 1 | USER A | (waveform) | TURN ON COOLER OF AIR CONDITIONER |
| 2 | USER A | (waveform) | TURN OFF COOLER OF AIR CONDITIONER |
| ... | ... | ... | ... |

INFORMATION PROCESSING DEVICE AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-225150 filed Dec. 13, 2019.

BACKGROUND

(i) Technical Field

The present disclosure relates to an information processing device and a non-transitory computer readable medium.

(ii) Related Art

It is conceivable to operate an operation target by using biological information such as brain waves.

Japanese Unexamined Patent Application Publication No. 2014-071825 describes a brain machine interface (BMI) device utilizing steady state visually evoked potential (SS-VEP).

Japanese Unexamined Patent Application Publication No. 2015-211705 describes a BMI exercise assistance device that detects a brain-wave biological signal from the brain waves of a user, detects a surface electromyography biological signal from the surface myoelectric potential of the user, and computes a control signal on the basis of both of the biological signals.

Japanese Unexamined Patent Application Publication No. 2015-102650 describes an imaging control device that prestores a brain wave condition that acts as a condition on brain waves produced in the case of recalling a specific movement of the body, acquires brain wave information, and in the case where a brain wave included in the acquired brain wave in a case in which satisfies the stored brain wave condition, outputs an imaging condition that acts as a condition in the case where an imaging device takes an image of a subject to the imaging device.

Japanese Unexamined Patent Application Publication No. 2002-166050 describes a method of matching a brain wave signal to an intention of a person.

SUMMARY

Meanwhile, in some cases, it may not be possible to operate an operation target using biological information.

Aspects of non-limiting embodiments of the present disclosure relate to assisting a user to operate an operation target using biological information in cases where operating an operation target using biological information is difficult.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing device including a processor configured to operate an operation target according to a first operation mode on a basis of biological information about a user, and operate the operation target according to a second operation mode different from the first operation mode on a basis of the biological information about the user in a case where biological information about the user is being measured and the operation target is not operated according to the first operation mode on the basis of the biological information about the user for a predetermined time or longer.

BRIEF DESCRIPTION OF THE DRAWINGS

Exemplary embodiments of the present disclosure will be described in detail based on the following figures, wherein:

FIG. 6 is a diagram illustrating a first management table;

FIG. 7 is a diagram illustrating a second management table;

DETAILED DESCRIPTION

Figure 1:
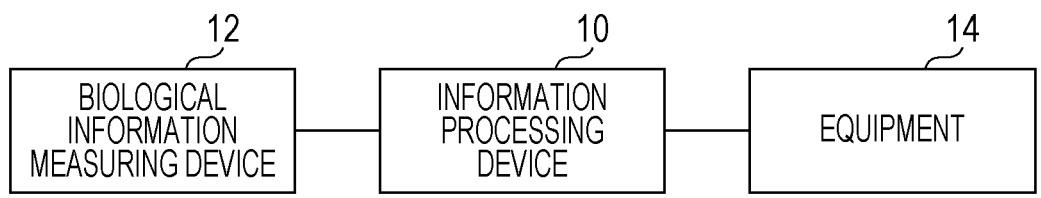
FIG. 1 is a block diagram illustrating a configuration of an information processing system according to an exemplary embodiment.

An information processing system according to the exemplary embodiment will be described with reference to FIG. 1. FIG. 1 illustrates an example of the configuration of the information processing system according to the exemplary embodiment.

The information processing system according to the exemplary embodiment includes an information processing device 10, one or more biological information measuring devices 12, and one or more pieces of equipment 14. The number of each device illustrated in FIG. 1 is merely one example. The information processing system may also include other devices (such as a terminal device and a server, for example) besides the devices illustrated in FIG. 1. Note that the equipment 14 does not have to be included in the information processing system in cases where the equipment 14 is not used.

Each device included in the information processing system is configured to communicate with the other devices. The communication may be wired communication using a cable, or wireless communication. In other words, each device may transmit and receive information with each other through physical connection to other devices using a cable, or transmit and receive information with each other through wireless communication. For the wireless communication, a technology such as short-range wireless communication or Wi-Fi (registered trademark) may be used, for example. Wireless communication according to a standard other than the above may also be used. The short-range wireless communication may be a technology such as Bluetooth (registered trademark), radio-frequency identifier (RFID), or NFC, for example. Each device may also communicate with another device through a communication channel such as a local area network (LAN) or the Internet.

The information processing device 10 is for example a personal computer (hereinafter referred to as "PC"), a tablet PC, a smartphone, a mobile phone, or some other type of device (such as a server, a robot, or other equipment, for example). The information processing device 10 may be a terminal device that a person is able to carry (such as a tablet PC, a smartphone, or a mobile phone, for example), a device that is installed on a table or the like and used, a device capable of moving (for example, a self-propelled device), a device that performs work, or a device capable of interacting with (such as talking to) a person. For example, the information processing device 10 may be a smart speaker including communication functions, a microphone, and a speaker, or a robot that interacts with a person and performs work. The information processing device 10 may also be a device equipped with artificial intelligence (AI).

The biological information measuring device 12 is a device configured to measure biological information about a person. For example, the biological information measuring device 12 includes components such as various sensors and electrodes, and measures biological information about a person. In the case where multiple biological information measuring devices 12 are used, each biological information measuring device 12 may measure a different type of biological information. Some or all of the multiple biological information measuring devices 12 may also measure the same type of biological information. In addition, the biological information measuring device 12 may be configured to measure a single type of biological information or multiple types of biological information.

The biological information measuring device 12 transmits measured biological information to the information processing device 10. The biological information measuring device 12 may transmit the biological information to the information processing device 10 every time the biological information is measured, or the biological information measuring device 12 may store the biological information and transmit the biological information to the information processing device 10 at predetermined time intervals or transmit the biological information to the information processing device 10 at a timing specified by the person. Also, each biological information measuring device 12 may receive biological information measured by another biological information measuring device 12 from the other biological information measuring device 12, and transmit the biological information measured by itself together with the biological information measured by the other biological information measuring device 12 to the information processing device 10.

Each biological information measuring device 12 may also analyze the biological information measured by itself or another biological information measuring device, and transmit information indicating a result of the analysis to the information processing device 10. For example, the biological information measuring device 12 may include a processor, and the processor may analyze the biological information. Obviously, such analysis may also be performed by the information processing device 10 or another device.

The biological information measuring device 12 may include a battery and be driven by power supplied from the battery, or be driven by receiving a supply of power from another device (such as the information processing device 10, for example).

The biological information measuring device 12 may be placed on a person. For example, the biological information measuring device 12 may be a wearable device that is worn by a person to measure biological information. To give specific examples, the biological information measuring device 12 may be a device worn on the person☐s head (such as on the forehead), a bearable device worn on the person☐s ears (such as earphones or headphones, for example), a device worn on a part of the body such as the person☐s arm, hand, wrist, or finger (such as a wristwatch-style device like a smartwatch, for example), a device worn around the person☐s neck, a device worn on the person☐s torso, or a device worn on the person☐s lower limb (such as the thigh, the lower leg, the knee, the foot, or the ankle, for example). The biological information measuring device 12 may also be health equipment or the like worn on the person☐s arm, hand, torso, or lower limb. The biological information measuring device 12 may also be worn on a part of the body other than the above. Additionally, biological information measuring devices 12 may be worn on each of multiple parts of the body.

The biological information is any of various types of physiological information and anatomical information produced by the living body of the person. As a conceptual category, biological information includes information such as information indicating the activity of the brain (such as brain waves, the quantity of cerebral blood flow, or a cerebral magnetic field signal, for example), information indicating the pulse frequency, myoelectric information such as a myoelectric waveform, information related to saliva (for example, information indicating the amount of saliva), information indicating a pulse wave, information indicating blood pressure, information indicating blood flow, information indicating pulse, information indicating heart rate, information indicating an electrocardiogram waveform, information indicating eye movement, information indicating body temperature, information indicating the amount of perspiration, information indicating a line of sight, speech information, and information indicating movement by the person, for example. Also, information specified by a biomarker may also be used as the biological information. The above biological information is merely an example, and other physiological information and anatomical information may also be used as the biological information. The biological information measuring device 12 may measure one type or multiple types of biological information from among the above types of biological information.

Additionally, the conceptual category of biological information includes bioelectric potential information indicating an electric potential measured from a living body. As a conceptual category, bioelectric potential information includes information such as brain waves obtained as a result of measuring tiny electric currents produced in association with brain activity, an electrocardiogram obtained as a result of measuring tiny electric currents produced in association with the pumping action of the heart, an electromyogram obtained as a result of measuring tiny electric currents produced in association with muscle activity, and electrodermal activity obtained as a result of measuring tiny electric currents occurring in the skin, for example. The above bioelectric potential information is merely an example, and bioelectric potential information other than the above may also be used.

The information processing device 10 receives biological information from the biological information measuring device 12 and performs operations such as analyzing the biological information, storing the biological information, outputting the biological information, storing information indicating a result of analyzing the biological information, and outputting information indicating a result of analyzing the biological information. Obviously, the analysis of the biological information may also be performed by the biological information measuring device 12 or another device. Outputting the biological information means displaying the biological information or outputting the biological information as sound information, for example. Outputting information indicating a result of analyzing the biological information means displaying information indicating an analysis result or outputting an analysis result as sound information, for example. The information processing device 10 may also transmit information indicating the biological information and the analysis result to another device.

The information processing device 10 may include one or multiple biological information measuring devices 12. In other words, one or multiple biological information measuring devices 12 may be incorporated into the information processing device 10 to form a single device. The entirety of the information processing device 10 including the one or more biological information measuring devices 12 may also be worn on the person and measure biological information. In other words, the information processing device 10 may also be a wearable device. For example, the information processing device 10 may be a device worn on the person☐s head (such as on the forehead), a bearable device worn on the person☐s ears (such as earphones or headphones, for example), a device worn on a part of the body such as the person☐s arm, hand, wrist, or finger (such as a wristwatch-style device like a smartwatch, for example), a device worn around the person☐s neck, a device worn on the person☐s torso, or a device worn on the person☐s lower limb (such as the thigh, the lower leg, the knee, the foot, or the ankle, for example). The information processing device 10 may also be health equipment or the like worn on the person☐s arm, hand, torso, or lower limb. The information processing device 10 may also be worn on a part of the body other than the above.

The information processing device 10 and the biological information measuring device 12 may also be separate devices. For example, the information processing device 10 may be a device such as a robot, a smart speaker, or a server, and the biological information measuring device 12 may be a wearable device worn on the person.

The equipment 14 is one example of an operation target. The equipment 14 is a device such as a PC, a tablet PC, a smartphone, a mobile phone, a robot (such as a humanoid robot, a non-humanoid animal robot, a cleaning robot, or some other type of robot, for example), a projector, a display device such as a liquid crystal display, a recording device, a playback device, an imaging device such as a camera, a refrigerator, a rice cooker, a microwave oven, a coffee maker, a vacuum cleaner, a washing machine, an air conditioner, lighting equipment, a clock, a surveillance camera, an automobile, a motorcycle, an aircraft (such as an unmanned aerial vehicle (for example, a drone)), a game console, a gas stove, a toilet seat with a bidet function, a ventilation fan, a doorbell, an entrance monitor, an elevator, a door, a window, or any of various types of sensing equipment (such as a temperature sensor, a humidity sensor, a voltage sensor, or a current sensor), for example. Equipment in general may also be included in the conceptual category of the equipment 14. For example, information equipment, video equipment, audio equipment, and other types of equipment may be included in the category of the equipment 14 according to the exemplary embodiment.

The equipment 14 includes a communication device that acts as a communication interface, a storage device that stores data, and a processor that controls the operation of the equipment 14. The equipment 14 may also include a user interface. The equipment 14 may also transmit equipment identification information for identifying the equipment 14 itself to the information processing device 10. For example, the equipment identification information is information such as an ID, a name, a serial number, or an address (such as a MAC address or an IP address for example) of the equipment 14.

In the exemplary embodiment, an operation target is operated on the basis of biological information about a user. For example, the information processing device 10 acquires biological information about the user from the biological information measuring device 12, and operates the operation target on the basis of the acquired biological information. For example, the information processing device 10 acquires biological information about the user from the biological information measuring device 12, specifies an operation item of the operation target on the basis of the acquired biological information, and operates the operation target according to the specified operation item. The process of specifying the operation item may be performed by the biological information measuring device 12 or another device (such as a server, the equipment 14, or a terminal device, for example). A device such as a server or a terminal device, for example) other than the information processing device 10 may also operate the operation target. For example, the information processing device 10 may specify the operation item on the basis of the biological information, and a device other than the information processing device 10 may operate the operation target according to the operation item specified by the information processing device 10.

The operation target may be hardware, software, or both hardware and software.

The hardware treated as the operation target is not particularly limited, and is for example the equipment 14 or a device other than the equipment 14 (such as the information processing device 10, the biological information measuring device 12, or a server, for example). Multiple pieces of hardware may also be the operation target. For example, multiple pieces of equipment 14, a combination of the information processing device 10 and one or more pieces of equipment 14, a combination of the equipment 14 and a server, or the like are examples of hardware treated as the operation target. Obviously, hardware and combinations other than the above may also be the hardware treated as the operation target.

The software treated as the operation target is not particularly limited, and is software such as an application program or an operating system (OS), for example. The software treated as the operation target may be software installed in the information processing device 10, software installed in the equipment 14, software installed in another device (for example, the biological information measuring device 12, a server, or some other device), or software provided over a communication channel such as the Internet. Multiple pieces of software may also be the operation target. In the case where multiple pieces of software are the operation target, each piece of software may be installed in the same piece of hardware or installed in different pieces of hardware.

In the present embodiment, the operation target is operated according to a first operation mode or a second operation mode on the basis of biological information about the user.

Operating the operation target according to the operation mode means, for example, operating the operation target according to a condition or standard for operating the operation target on the basis of biological information about the user, operating the operation target according to a condition or standard related to the measurement of biological information about the user (for example, a condition or standard related to the detection sensitivity), or operating an operation target according to a condition or standard related to the environment in which the biological information about the user is measured.

Operating the operation target according to the first operation mode means, for example, operating the operation target according to a first condition or a first standard for operating the operation target on the basis of biological information about the user, operating the operation target according to a first condition or a first standard related to the measurement of biological information about the user, or operating an operation target according to a first condition or a first standard related to the environment in which the biological information about the user is measured.

Operating the operation target according to the second operation mode means, for example, operating the operation target according to a second condition or a second standard for operating the operation target on the basis of biological information about the user, operating the operation target according to a second condition or a second standard related to the measurement of biological information about the user, or operating an operation target according to a second condition or a second standard related to the environment in which the biological information about the user is measured.

The first condition and the second condition are different conditions. The first standard and the second standard are different standards.

For example, in the case where the operation mode is set to the first operation mode and the operation target is operated according to the first operation mode, if the operation target is not operated on the basis of biological information about the user, the operation mode is switched from the first operation mode to the second operation mode, and the operation target is operated according to the second operation mode. Specific examples of operation modes will be described in detail later.

Figure 2:
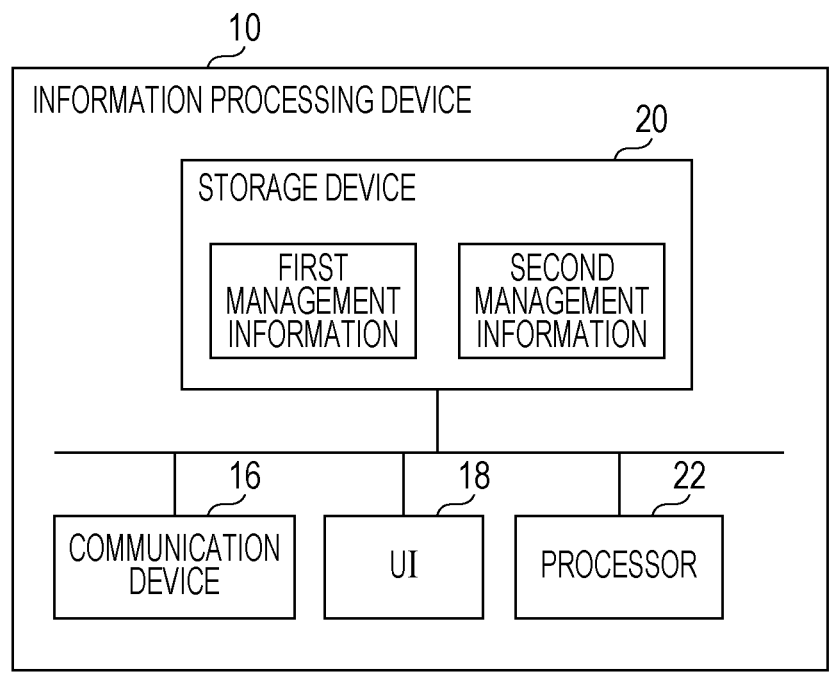
FIG. 2 is a block diagram illustrating a configuration of an information processing device according to the exemplary embodiment.

Hereinafter, FIG. 2 will be referenced to describe the configuration of the information processing device 10 in detail. FIG. 2 illustrates an example of the configuration of the information processing device 10.

The information processing device 10 includes a communication device 16, a UI 18, a storage device 20, and a processor 22, for example. The information processing device 10 may also include components other than the above.

The communication device 16 is a communication interface, and has a function of transmitting data to other devices and a function of receiving data transmitted from other devices. The communication device 16 may have a wireless communication function, and may also have a wired communication function. The communication device 16 may communicate with another device by using short-range wireless communication for example, or communicate with another device through a communication channel such as a LAN or the Internet. For example, the communication device 16 receives biological information transmitted from the biological information measuring device 12. The communication device 16 may also transmit control information for controlling the operation of the biological information measuring device 12 to the biological information measuring device 12. In addition, the communication device 16 may also transmit control information for controlling the operation of the equipment 14 to the equipment 14, and receive information transmitted from the equipment 14.

The UI 18 is a user interface, and includes at least one of a display device and an operation device. The display device is a device such as a liquid crystal display or an EL display. The operation device is a device such as a keyboard, input keys, or a control panel. The UI 18 may be a UI such as a touch panel combining a display device with an operation device.

The storage device 20 is a device that establishes one or multiple storage areas that store data. For example, the storage device 20 is a hard disk drive, any of various types of memory (such as RAM, DRAM, and ROM, for example), another type of storage device (such as an optical disc, for example), or a combination of the above. One or more storage devices 20 are included in the information processing device 10.

First management information and second management information is stored in the storage device 20, for example.

The first management information and the second management information is information for specifying an operation item of the operation target on the basis of the biological information about the user.

The first management information is management information used in the first operation mode. The second management information is management information used in the second operation mode. In other words, in the case where the operation target is operated according to the first operation mode, an operation item is specified on the basis of the first management information. In the case where the operation target is operated according to the second operation mode, an operation item is specified on the basis of the second management information.

As another example, the first management information may be used in both the first operation mode and the second operation mode, and the second management information does not have to be used. In other words, in the case where the operation target is operated according to the first operation mode, an operation item is specified on the basis of the first management information. In the case where the operation target is operated according to the second operation mode, an operation target is still specified on the basis of the second management information.

For example, predetermined first standard biological information and operation information indicating an operation item of the operation target are associated with each other and registered in the first management information in advance. The first standard biological information may be biological information that is estimated to occur in the user who performs an operation associated with the first standard biological information, or biological information that is estimated to occur in the user who requests the execution of the operation. The first standard biological information may also be considered to be biological information indicating an operation item of the operation target. The operation information indicating an operation item may also include information indicating the operation target to be operated according to the operation item. The first standard biological information and the operation information may be associated with each other and registered in the first management information for each user.

Also, predetermined second standard biological information and operation information indicating an operation item of the operation target are associated with each other and registered in the second management information in advance. The second standard biological information is biological information different from the first standard biological information.

Note that at least one of the first management information and the second management information may be stored in a device other than the information processing device 10 without being stored in the information processing device 10, or in addition to being stored in the information processing device 10.

The processor 22 is configured to acquire biological information about the user and operate the operation target on the basis of the biological information.

For example, when biological information from the user is measured by the biological information measuring device 12, the biological information is transmitted from the biological information measuring device 12 to the information processing device 10. The processor 22 receives the biological information and specifies an operation item of an operation target on the basis of the biological information. The processor 22 operates the operation target according to the specified operation item. The processor 22 may also specify an operation target and an operation item of the operation target on the basis of the biological information about the user. As a different example, the operation target may also be predetermined. For example, the operation target may be designated by the user. In this case, the processor 22 specifies an operation item of the predetermined operation target on the basis of the biological information about the user.

In the case where the operation target is the equipment 14, the processor 22 operates the equipment 14 by transmitting control information including operation in a case in which indicating the specified operation item to the equipment 14. The equipment 14 treated as the operation target operates in accordance with the control information. The same also applies to cases where hardware other than the equipment 14 is the operation target.

In the case where the operation target is software, the processor 22 operates the software according to the specified operation item. For example, the processor 22 may launch the software, or use the software to perform a process. In the case where the software is installed in the information processing device 10, the processor 22 executes the software installed in the information processing device 10. In the case where the software is installed in a device other than the information processing device 10, the processor 22 operates the software by transmitting control information including operation information indicating the operation item to the device in which the software is installed.

For example, in the case where the operation mode is the first operation mode, the processor 22 compares biological information about the user to each piece of first standard biological information registered in the first management information above, and searches for first standard biological information whose difference from the biological information is inside a tolerance. The processor 22 specifies the operation item for the operation target associated with the first standard biological information returned by the search. With this arrangement, an operation target and an operation item of the operation target are specified. The tolerance is predetermined. The tolerance may also be changed by the user. The tolerance may also be determined for each user.

In the case where the search returns multiple pieces of first standard biological information whose difference from the biological information about the user is inside the tolerance, the processor 22 may specify the first standard biological information having the smallest difference from the biological information from among the multiple pieces of first standard biological information and specify the operation item associated with the specified first standard biological information, or specify the operation item(s) associated with each of the multiple pieces of first standard biological information.

The first standard biological information may be information indicating a characteristic component of the biological information. In this case, the processor 22 may extract the characteristic component from the biological information about the user, and search for first standard biological information having a component whose difference from the extracted component is inside a tolerance. For example, in the case where brain waves are used as the biological information, the processor 22 may estimate the operation item expressed by brain waves by extracting a characteristic component from brain waves of the user, and analyzing the component.

The first standard biological information may also be used as a first threshold. For example, in the case where the first standard biological information expresses a wave form, the amplitude of a peak in the waveform is used as the first threshold. In this case, the processor 22 searches for first standard biological information having a waveform resembling or similar to a waveform expressed by biological information about the user and for which the biological information about the user is the first threshold or greater, and specifies the operation item associated with the first standard biological information returned by the search. In other words, in the case where the waveform expressed by the biological information about the user resembles or is similar to the waveform expressed by certain first standard biological information, and the amplitude of a peak in the waveform expressed by the biological information about the user is equal to or greater than a first threshold set as the amplitude of a peak in the waveform expressed by the first standard biological information, the processor 22 specifies the operation item associated with the first standard biological information.

In the case where the operation mode is the second operation mode, the processor 22 compares biological information about the user to each piece of second standard biological information registered in the second management information above, and searches for second standard biological information whose difference from the biological information is inside a tolerance. The processor 22 specifies the operation item for the operation target associated with the second standard biological information returned by the search. With this arrangement, an operation target and an operation item of the operation target are specified. The tolerance is predetermined. The tolerance may also be changed by the user. The tolerance may also be determined for each user.

In the case where the search returns multiple pieces of second standard biological information whose difference from the biological information about the user is inside the tolerance, the processor 22 may specify the second standard biological information having the smallest difference from the biological information from among the multiple pieces of second standard biological information and specify the operation item associated with the specified second standard biological information, or specify the operation item(s) associated with each of the multiple pieces of second standard biological information.

Like the case where the first management information is used, the second standard biological information may also be information indicating a characteristic component of the biological information.

In addition, the second standard biological information may also be used as a second threshold. For example, in the case where the second standard biological information expresses a wave form, the amplitude of a peak in the waveform is used as the second threshold. In this case, the processor 22 searches for second standard biological information having a waveform resembling or similar to a waveform expressed by biological information about the user and for which the biological information about the user is the second threshold or greater, and specifies the operation item associated with the second standard biological information returned by the search. In other words, in the case where the waveform expressed by the biological information about the user resembles or is similar to the waveform expressed by certain second standard biological information, and the amplitude of a peak in the waveform expressed by the biological information about the user is equal to or greater than a second threshold set as the amplitude of a peak in the waveform expressed by the second standard biological information, the processor 22 specifies the operation item associated with the second standard biological information.

The second threshold has a smaller value than the first threshold. In other words, the amplitude of the peak expressed by the second standard biological information is smaller than the amplitude of the peak expressed by the first standard biological information.

Note that even in the case where the operation mode is the second operation mode, the processor 22 may specify an operation item of the operation target by using the first management information.

In the case of operating the operation target using information expressing brain activity, a brain-machine interface may be constructed by the biological information measuring device 12 that measures brain activity and the information processing device 10. The brain-machine interface may be invasive or non-invasive. In this case, the processor 22 operates the operation target on the basis of the activity (such as brain waves for example) of the user☐s brain. To operate the operation target, the processor 22 may extract a characteristic component from brain waves, and operate the operation target on the basis of the extracted component. To extract a characteristic component from brain waves, techniques such as a fast Fourier transform (FFT), a wavelet transform (WT), a time-frequency distribution (TFD), eigenvector methods (EM), or an autoregressive model (ARM) may be used. Also, as a method of linking brain waves to an operation item of the operation target using feature vectors obtained by feature extraction, for example, techniques such as independent component analysis (ICA), k-means clustering, a support vector machine (SVM), or a convolutional neural network may be used.

Also, the processor 22 may receive identification information of the operation target transmitted from the operation target and identify the operation target. For example, the processor 22 may transmit a request to acquire identification information to the operation target, and acquire identification information transmitted from the operation target in response to the request. Also, identification information of a piece of hardware or identification information of software installed in the hardware may be transmitted to the information processing device 10 from the hardware made capable of communicating with the information processing device 10 by being connected or the like to the information processing device 10. The processor 22 receives the identification information transmitted in this way.

The processor 22 operates the operation target according to the first operation mode on the basis of biological information about the user. In the case where biological information about the user is being measured and the operation target is not operated according to the first operation mode on the basis of the biological information about the user for a predetermined time or longer, the processor 22 operates the operation target according to the second operation mode on the basis of the biological information about the user. For example, if an operation item is not specified according to the first operation mode on the basis of the biological information about the user for the predetermined time or longer, the processor 22 operates the operation target according to the second operation mode on the basis of the biological information about the user. Hereinafter, the predetermined time will be referred to as the "first time". Note that the first time may be changed by the user, and may also be determined for each user.

For example, a point in time when the measurement of the biological information about the user is started, a specific point in time after the measurement of the biological information is started, a point in time when the biological information measuring device 12 that measures the biological information about the user is turned on, or a point in time when the user puts on the biological information measuring device 12 may be treated as a standard point in time, and in the case where the operation target is not operated according to the first operation mode on the basis of the biological information about the user for the first time or longer from the standard point in time, the processor 22 operates the operation target according to the second operation mode on the basis of the biological information about the user. The specific point in time may be designated by the user, or may be predetermined.

In the case where biological information about the user is being measured, and biological information indicating an operation item of the operation target is measured from the user within less than the first time from the standard point in time, the processor 22 may operate the operation target according to the first operation mode on the basis of the biological information about the user. Also, in the case where biological information about the user is being measured, and biological information indicating an operation item of the operation target is not measured from the user within less than the first time from the standard point in time, the processor 22 may operate the operation target according to the second operation mode on the basis of the biological information about the user.

In the case where the operation mode is switched from the first operation mode to the second operation mode, the processor 22 may also notify the user that the operation mode has been switched from the first operation mode to the second operation mode. For example, the processor 22 may cause a display device of the UI 18 to display information indicating that the operation mode has been switched, or produce sound expressing the information.

In addition, the processor 22 may also be configured to control the operation of each unit of the information processing device 10. The processor 22 may include memory.

Note that the processes by the processor 22 may also be executed by a device other than the information processing device 10 (such as a terminal device, a server, the biological information measuring device 12, the equipment 14, or some other device, for example). Also, a portion of the processes may be executed by the information processing device 10, while a different portion of the processes may be executed by a device other than the information processing device 10. For example, the analysis of the biological information (for example, the process of specifying an operation item) may be executed by a device other than the information processing device 10, while the operation of the operation target may be executed by the information processing device 10.

Figure 3:
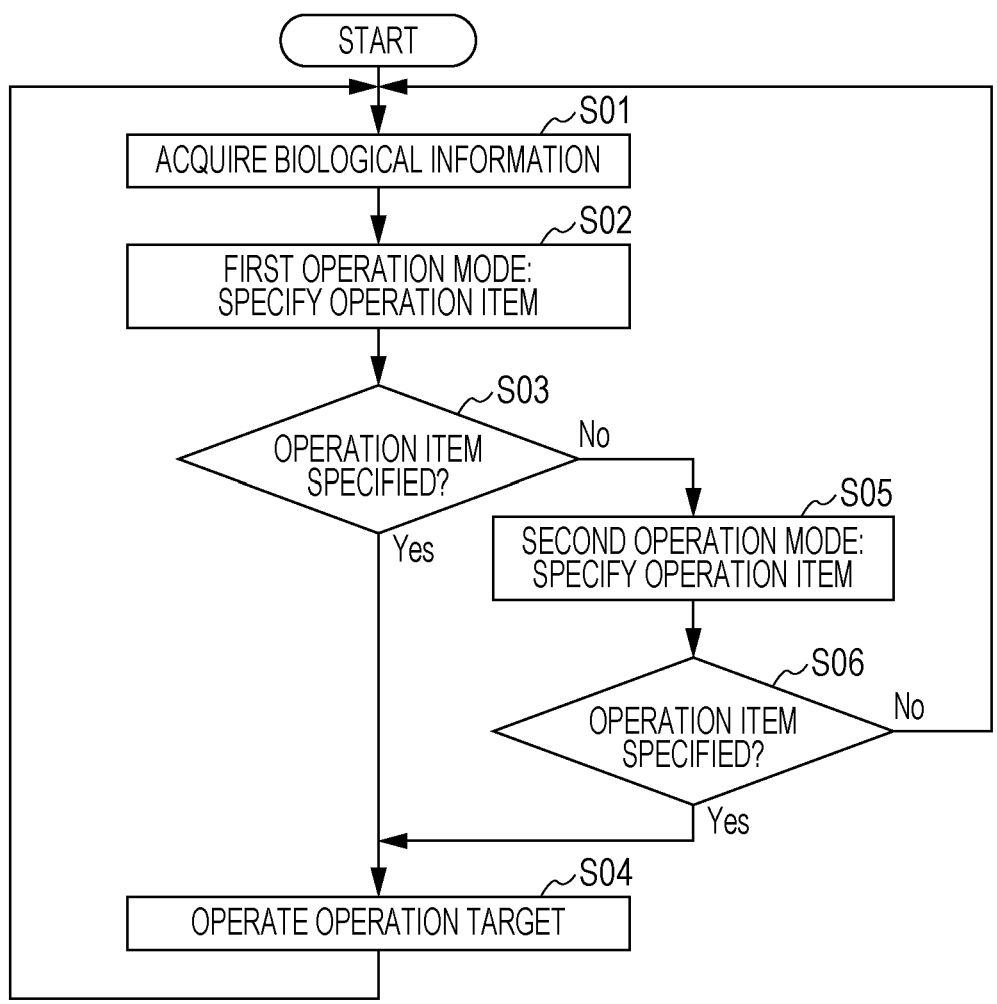
FIG. 3 is a diagram illustrating a flowchart that illustrates the flow of processes by the information processing device according to the exemplary embodiment.

Hereinafter, FIG. 3 will be referenced to describe a flow of processes by the information processing device 10. FIG. 3 illustrates a flowchart illustrating one example of a flow of processes by the information processing device 10.

First, the processor 22 acquires biological information about the user (S01). For example, biological information about the user is measured by the biological information measuring device 12, the biological information is transmitted from the biological information measuring device 12 to the information processing device 10, and the processor 22 acquires the biological information.

Next, the processor 22 specifies an operation item according to the first operation mode on the basis of biological information about the user (S02). For example, the processor 22 searches the first management information for first standard biological information whose difference from the biological information about the user is inside the tolerance, and specifies the operation item indicated by the operation information associated with the first standard biological information. Obviously, the processor 22 may also specify an operation item by a method other than using the first management information.

For example, in the case where an operation item is specified according to the first operation mode within less than the first time from the standard point in time (S03, Yes), the processor 22 operates the operation target according to the specified operation item (S04). Subsequently, the process returns to step S01. For example, in the case where first standard biological information whose difference from the biological information about the user is inside the tolerance is returned from a search of the first management information, an operation item is specified, and the operation target is operated according to the operation item.

In the case where an operation item is not specified according to the first operation mode for the first time or longer from the standard point in time (S03, No), the processor 22 specifies an operation item according to the second operation mode on the basis of biological information about the user (S05). In other words, the processor 22 switches the operation mode from the first operation mode to the second operation mode. For example, in the case where first standard biological information whose difference from the biological information about the user is inside the tolerance is not returned from a search of the first management information for the first time or longer from the standard point in time, an operation item is not specified according to the first operation mode. In this case, the process in step S05 is executed. For example, the processor 22 searches the second management information for second standard biological information whose difference from the biological information about the user is inside the tolerance, and specifies the operation item indicated by the operation information associated with the second standard biological information. Obviously, the processor 22 may also specify an operation item by a method other than using the second management information.

In the case where an operation item is specified according to the second operation mode (S06, Yes), the processor 22 operates the operation target according to the specified operation item (S04). Subsequently, the process returns to step S01.

For example, in the case where an operation item is specified according to the second operation mode within less than a second time from a certain point in time, the processor 22 operates the operation target according to the specified operation item. For example, the certain point in time may be the standard point in time above, the point in time when the operation mode is switched from the first operation mode to the second operation mode, or a point in time when a predetermined time has elapsed since the point in time of the switch. The processor 22 may also notify the user that the operation mode has been switched from the first operation mode to the second operation mode.

In the case where the operation mode is switched from the first operation mode to the second operation mode and the operation target is operated on the basis of biological information about the user, in the processes thereafter, the processor 22 may operate the operation target by specifying an operation item according to the second operation mode. As another example, the operation mode may be switched from the second operation mode to the first operation mode within a predetermined time from the point in time when the operation target begins to be operated according to the second operation mode, a specific point in time later than the point in time when the operation target begins to be operated according to the second operation mode, or the point in time when the operation mode is switched from the first operation mode to the second operation mode. Also, the operation mode may be kept in the second operation mode or the operation mode may be switched from the second operation mode to the first operation mode according to an instruction from the user.

In the case where an operation item is not specified according to the second operation mode within less than the second time (S06, No), the operation target is not operated on the basis of the biological information about the user, and the process returns to step S01. For example, in the case where second standard biological information whose difference from the biological information about the user is inside the tolerance is not returned from a search of the second management information, an operation item is not specified according to the second operation mode. In this case, the operation target is not operated. The processor 22 may also notify the user that an operation item has not been specified according to the second operation mode. In the processes thereafter, the processor 22 may operate the operation target by specifying an operation item according to the first operation mode or operate the operation target by specifying an operation item according to the second operation mode.

Figure 4:
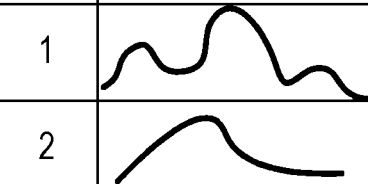
FIG. 4 is a diagram illustrating a first management table.
Figure 4:

Hereinafter, FIG. 4 will be referenced to describe a specific example of the first management information. FIG. 4 illustrates an example of a first management table as one example of the first management information. The data in the first management table is stored in the storage device 20. The data in the first management table may be stored in a device other than the information processing device 10 without being stored in the storage device 20, or in addition to being stored in the storage device 20.

In the first management table, an ID, a first standard brain wave, and operation information indicating an operation item of the operation target are associated with each other in advance. The first standard brain wave is one example of the first standard biological information. Herein, a brain wave is used as one example of the first standard biological information, but biological information other than brain waves may also be used as the first standard biological information.

The ID is information for managing the information registered in the first management table.

The first standard brain wave is determined by statistical processing, for example, and is a brain wave that is generally estimated to occur in the user who performs the operation item associated with the first standard brain wave, or a brain wave that is generally estimated to occur in the user who requests the execution of the operation item. The first standard brain wave may be a brain wave in a specific frequency band, or a brain wave containing brain waves in multiple frequency bands.

The operation information is information including identification information, which is information for identifying the operation target, and information indicating the operation item to be performed with respect to the operation target.

For example, the operation item for a piece of hardware may be an operation of turning the power of the hardware on or off, or an operation of setting a function level of the hardware. Both the operation of turning the power on or off and the operation of setting a function level may be registered in the first management table as operation items.

A function level is a level related to the performance or output of the hardware, for example. To give specific examples, the set temperature of an air conditioner, the amount of airflow of an air conditioner, the direction of airflow of an air conditioner, the activation or deactivation of a dehumidifier function of an air conditioner, the brightness of a display device, the brightness of a lighting device, the volume of a speaker, the movement speed of a self-propelled device (such as a robot or a self-propelled vacuum cleaner, for example), settings in devices such as an imaging device, a recording device, and a playback device, settings in devices such as a refrigerator, a rice cooker, and a microwave oven, settings in any of various types of sensing equipment, and the like correspond to examples of function levels. However, the above are merely an example, and set values and the like other than the above may also be function levels.

For example, the first standard brain wave with the ID "1" is a brain wave indicating an operation item of turning on the cooler of an air conditioner. The first standard brain wave with the ID "2" is a brain wave indicating an operation item of turning off the cooler of an air conditioner.

For example, in the case where the operation mode is the first operation mode, and a brain wave whose difference from the first standard brain wave with the ID "1" is inside the tolerance is measured from the user, the processor 22 specifies the operation item of "turn on cooler of air conditioner" associated with the first standard brain wave. Additionally, the processor 22 transmits control information including information indicating the operation item of "turn on cooler of air conditioner" to the air conditioner. The air conditioner operates in accordance with the control information. With this arrangement, the cooler of the air conditioner turns on.

Figure 5:
FIG. 5 is a diagram illustrating a second management table.
Figure 5:

Hereinafter, FIG. 5 will be referenced to describe a specific example of the second management information. FIG. 5 illustrates an example of a first management table as one example of the second management information. The data in the first management table is stored in the storage device 20. The data in the first management table may be stored in a device other than the information processing device 10 without being stored in the storage device 20, or in addition to being stored in the storage device 20.

In the second management table, an ID, a second standard brain wave, and operation information indicating an operation item of the operation target are associated with each other in advance. The second standard brain wave is one example of the second standard biological information. Herein, a brain wave is used as one example of the second standard biological information, but biological information other than brain waves may also be used as the second standard biological information.

The ID is information for managing the information registered in the second management table. The operation information registered in the second management table is the same operation information as the operation information registered in the first management table.

The second standard brain wave is a brain wave having a waveform whose amplitude or features are changed as compared to the first standard brain wave.

For example, the amplitude of the second standard brain wave is smaller than the amplitude of the first standard brain wave. To give a specific example, the second standard brain wave with the ID "1" is a waveform having the same number of peaks as the first standard brain wave with the ID "1", but the amplitude of each peak in the second standard brain wave with the ID "1" is smaller than the amplitude of each peak in the first standard brain wave with the ID "1". For example, the amplitude of each peak in the first standard brain wave may be used as the first threshold, and the amplitude of each peak in the second standard brain wave may be used as the second threshold. As a different example, a feature of the second standard brain wave may be smaller than a feature of the first standard brain wave. The feature is the number of peaks in the waveform, for example.

For example, in the case where the operation mode is the second operation mode, and a brain wave whose difference from the second standard brain wave with the ID "1" is inside the tolerance is measured from the user, the processor 22 specifies the operation item of "turn on cooler of air conditioner" associated with the second standard brain wave. Additionally, the processor 22 turns on the cooler of the air conditioner by transmitting control information including information indicating the operation item of "turn on cooler of air conditioner" to the air conditioner.

For example, in the case where biological information about the user is being measured, and a brain wave whose difference from the first standard brain wave with the ID "1" in the first management table is inside the tolerance is measured from the user within less than the first time from the standard point in time, the processor 22 specifies the operation item of "turn on cooler of air conditioner" associated with the first standard brain wave, and turns on the cooler of the air conditioner.

In the case where biological information about the user is being measured, and a brain wave whose difference from each first standard brain wave registered in the first management table is inside the tolerance is not measured from the user for the first time or longer from the standard point in time, the processor 22 specifies an operation item by using the second management table. For example, in the case where a brain wave whose difference from the second standard brain wave with the ID "1" in the second management table is inside the tolerance is measured from the user, the processor 22 specifies the operation item of "turn on cooler of air conditioner" associated with the second standard brain wave, and turns on the cooler of the air conditioner.

The first standard biological information and the operation information may be associated with each other and registered in the first management table for each user. For example, biological information about the user may be registered as first standard biological information for the user in the first management table. Similarly, the second standard biological information and the operation information may be associated with each other and registered in the second management table for each user. The second standard biological information is biological information whose amplitude or features are changed as compared to the first standard biological information.

FIG. 6 illustrates an example of a first management table in which specific first standard biological information for individual users is registered. In the management table illustrated in FIG. 6, an ID, user information a first standard brain wave given as an example of the first standard biological information, and operation information are associated with each other. The user information is information for identifying each user (such as a username, a user ID, or a user account, for example).

The first standard brain wave associated with the user information is a brain wave measured from the user when the user indicated by the user information performs the operation item associated with the first standard brain wave, or a brain wave measured from the user when the user requests the operation item. Each first standard brain wave measured from each user is measured from each user in advance and registered in the first management table.

For example, the brain wave of a user A when the user A manually turns on the cooler of the "air conditioner" is measured by the biological information measuring device 12, and the measured brain wave is registered in the first management table as a first standard brain wave expressing the operation item of "turn on cooler of air conditioner" by the user A.

In this case, the measured first standard brain wave of the user A is registered in the first management table in association with operation information indicating the operation item of "turn on cooler of air conditioner" and user information for identifying the user A. The registration may be performed using the information processing device 10 or using another device. In the example illustrated in FIG. 6, the information is registered as the information with the ID "1". The same applies to other operations and other users.

Note that the work of registration may also be performed multiple times, and the average of multiple brain waves measured thereby may also be registered as a first standard brain wave. For example, the work of the user manually turning on the cooler of the "air conditioner" and the biological information measuring device 12 measuring the brain wave produced from the user A at the time may be performed multiple times, and an average of the multiple brain waves measured thereby may be registered in the first management table as a first standard brain wave of the user A.

For example, in the case where the operation mode is the first operation mode, user A is logged in to the information processing device 10, and a brain wave whose difference from the first standard brain wave with the ID "1" is inside the tolerance is measured from the user A, the processor 22 turns on the cooler of the "air conditioner" by transmitting control information including the operation information corresponding to the ID "1" to the "air conditioner". Described in further detail, if a brain wave is measured by the biological information measuring device 12 while the user A is logged in to the information processing device 10, the processor 22 searches for a first standard brain wave that is registered in the management table in association with user information for identifying the logged-in user A. In the example illustrated in FIG. 6, the first standard brain wave with the ID "1" and the first standard brain wave with the ID "2" are registered in the management table as standard brain waves of the user A, and therefore these first standard brain waves are returned by the search. In the case where the difference between the measured brain wave and the first standard brain wave with the ID "1" is inside the tolerance, the processor 22 turns on the cooler of the "air conditioner" by transmitting control information including the operation information corresponding to the ID "1" to the "air conditioner". In the case where the difference between the measured brain wave and the first standard brain wave with the ID "2" is inside the tolerance, the processor 22 turns off the cooler of the "air conditioner" by transmitting control information including the operation information corresponding to the ID "2" to the "air conditioner".

As another example, in the case where the operation mode is the first operation mode, the user operating the operation target is set to "user A" in the information processing device 10, and a brain wave whose difference from the first standard brain wave with the ID "1" is inside the tolerance is measured from the user A, the processor 22 may turn on the cooler of the "air conditioner" by transmitting control information including the operation information corresponding to the ID "1" to the "air conditioner". Described in further detail, if a brain wave is measured by the biological information measuring device 12 while the user operating the operation target is set to "user A" in the information processing device 10, the processor 22 searches for a first standard brain wave that is registered in the management table in association with user information for identifying the user A who is the user operating the operation target. In the case where the difference between the measured brain wave and the first standard brain wave with the ID "1" is inside the tolerance, the processor 22 turns on the cooler of the "air conditioner" by transmitting control information including the operation information corresponding to the ID "1" to the "air conditioner". The user operating the operation target is set in the information processing device 10 by the user, for example.

For users other than the user A, each piece of information is likewise registered in the first management table similarly to the user A.

FIG. 7 illustrates an example of a second management table in which specific second standard biological information for individual users is registered. In the second management table illustrated in FIG. 7, an ID, user information a second standard brain wave given as an example of the second standard biological information, and operation information are associated with each other.

Like the second management table illustrated in FIG. 5, the second standard brain wave is a brain wave having a waveform whose amplitude or features are changed as compared to the first standard brain wave.

For example, the amplitude of the second standard brain wave is smaller than the amplitude of the first standard brain wave. To give a specific example, the second standard brain wave with the ID "1" is a waveform having the same number of peaks as the first standard brain wave with the ID "1", but the amplitude of each peak in the second standard brain wave with the ID "1" is smaller than the amplitude of each peak in the first standard brain wave with the ID "1". As a different example, a feature of the second standard brain wave may be smaller than a feature of the first standard brain wave. The feature is the number of peaks in the waveform, for example.

For example, each second standard brain wave illustrated in FIG. 7 is generated by processing each first standard brain wave illustrated in FIG. 6. The processing may be performed by the information processing device 10 or by another device.

For example, in the case where the operation mode is the second operation mode, user A is logged in to the information processing device 10, and a brain wave whose difference from the second standard brain wave with the ID "1" is inside the tolerance is measured from the user A, the processor 22 turns on the cooler of the "air conditioner" by transmitting control information including the operation information corresponding to the ID "1" to the "air conditioner".

For users other than the user A, each piece of information is likewise registered in the second management table similarly to the user A.

In FIGS. 4 to 7, operation information indicating an operation of turning the power of the hardware on or off is illustrated, but operation information indicating an operation of setting a function level of the hardware may also be registered in each management table. In addition, operation information indicating an operation item of software may also be registered in each management table. Both operation information indicating an operation item of hardware and operation information indicating an operation item of software may also be registered in each management table.

Note that the information registered in the first management table and the information registered in the second management table may also be registered in the same management table, without being registered in separate management tables. For example, the ID, the first standard brain wave, the second standard brain wave, and the operation information may be pre-associated with each other and registered in the same management table. User information additionally may be associated with the above information.

Hereinafter, Examples will be described.

EXAMPLE 1

Figure 8:
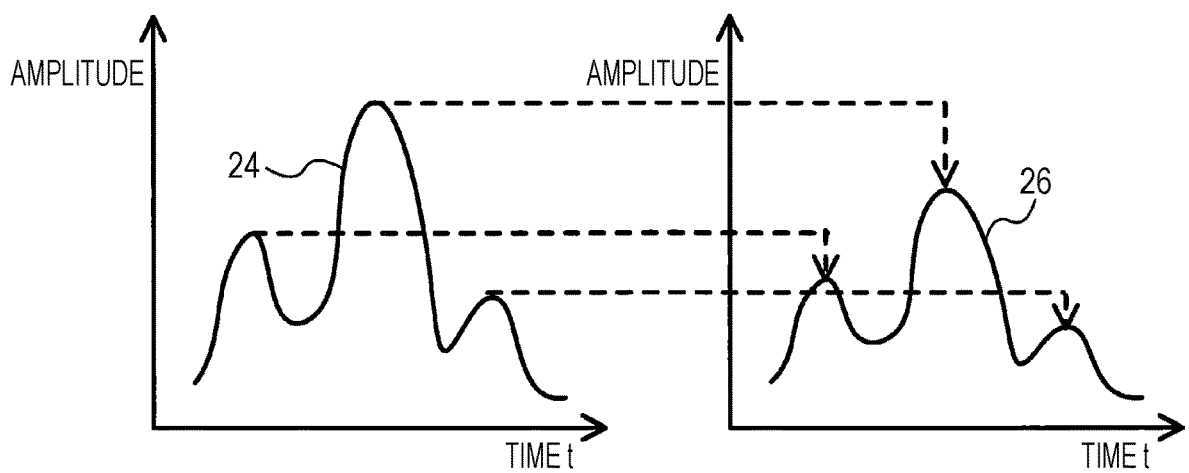
FIG. 8 is a graph illustrating change over time in biological information.

Hereinafter, FIG. 8 will be referenced to describe Example 1. FIG. 8 is a graph illustrating change over time in biological information. The horizontal axis represents time, while the vertical axis represents amplitude.

In Example 1, in the first operation mode, the processor 22 operates the operation target according to the result of a comparison between biological information about the user and the first threshold. Also, in the second operation mode, the processor 22 operates the operation target according to the result of a comparison between biological information about the user and the second threshold that is different from the first threshold. The second threshold has a smaller value than the first threshold. Hereinafter, Example 1 will be described in detail.

A waveform 24 in FIG. 8 is one example of the first standard biological information associated with operation information indicating a certain operation item X. The amplitude of each peak in the waveform 24 is used as the first threshold. A waveform 26 is one example of the second standard biological information associated with operation information indicating the operation item X. The amplitude of each peak in the waveform 26 is used as the second threshold. The amplitude of each peak in the waveform 26 is smaller than the amplitude of each corresponding peak in the waveform 24. In other words, the second threshold is smaller than the first threshold.

For example, the waveforms 24 and 26 are brain waves. The waveform 24 is one example of the first standard brain wave registered in the first management table. The waveform 26 is one example of the second standard brain wave registered in the second management table. The waveforms 24 and 26 are both standard brain waves associated with operation information indicating the same operation item X. The waveforms 24 and 26 may also be biological information other than brain waves.

In the first operation mode, the processor 22 compares a waveform indicating biological information about the user (for example, a brain wave) to the waveform 24. In the case where the shape of the waveform indicated by the biological information about the user resembles or is similar to the shape of the waveform 24, and the amplitude of each peak in the waveform indicated by the biological information about the user is equal to or greater than the amplitude of each peak in the waveform 24, the processor 22 specifies the operation item X indicated by the operation information associated with the waveform 24. In other words, in the case where the amplitude of each peak in the waveform indicated by the biological information about the user is equal to or greater than the first threshold indicated by the waveform 24, the processor 22 specifies the operation item X indicated by the operation information associated with the waveform 24. The processor 22 operates the operation target according to control information including operation information indicating the specified operation item X.

In the second operation mode, the processor 22 compares a waveform indicating biological information about the user (for example, a brain wave) to the waveform 26. In the case where the shape of the waveform indicated by the biological information about the user resembles or is similar to the shape of the waveform 26, and the amplitude of each peak in the waveform indicated by the biological information about the user is equal to or greater than the amplitude of each peak in the waveform 26, the processor 22 specifies the operation item X indicated by the operation information associated with the waveform 26. In other words, in the case where the amplitude of each peak in the waveform indicated by the biological information about the user is equal to or greater than the second threshold indicated by the waveform 26, the processor 22 specifies the operation item X indicated by the operation information associated with the waveform 26. The processor 22 operates the operation target according to control information including operation information indicating the specified operation item X.

For example, in the period within less than the first time from the standard point in time, the processor 22 compares the brain wave of the user to each first standard brain wave registered in the first management table according to the first operation mode. In the case where the shape of the waveform indicated by the brain wave of the user resembles or is similar to the shape of the waveform 24, and the amplitude of each peak in the waveform indicated by the brain wave of the user is equal to or greater than the amplitude of each peak in the waveform 24, the processor 22 specifies the operation item X indicated by the operation information associated with the waveform 24.

In the case where an operation item is not specified according to the first operation mode for the first time or longer from the standard point in time, the processor 22 compares the brain wave of the user to each second standard brain wave registered in the second management table according to the second operation mode. In the case where the shape of the waveform indicated by the brain wave of the user resembles or is similar to the shape of the waveform 26, and the amplitude of each peak in the waveform indicated by the brain wave of the user is equal to or greater than the amplitude of each peak in the waveform 26, the processor 22 specifies the operation item X indicated by the operation information associated with the waveform 26.

In other words, in the case where an operation item is not specified according to the first operation mode for the first time or longer from the standard point in time, the processor 22 lowers the threshold from the first threshold to the second threshold, and specifies an operation item corresponding to the brain wave of the user by using the second threshold.

For example, situations may occur in which instructing the operation target to perform an operation is difficult because of inadequate contact with an electrode or sensor of the biological information measuring device 12, because the user does not understand how to produce biological information for operating the operation target, because the user has difficulty producing the biological information well, or because the user does not know what to recall to be able to operate the operation target, for example. In such cases, by switching the operation mode from the first operation mode to the second operation mode, the occurrence of such situations may be reduced or avoided.

Note that the first threshold and the second threshold may also be thresholds related a parameter other than amplitude. For example, the first threshold and the second threshold may also be thresholds related to the frequency or the frequency band of a waveform. In this case, the processor 22 may specify an operation item by comparing the frequency or frequency band of the waveform indicated by the biological information about the user to a frequency or a frequency band that acts as a threshold.

EXAMPLE 2

Figure 9:
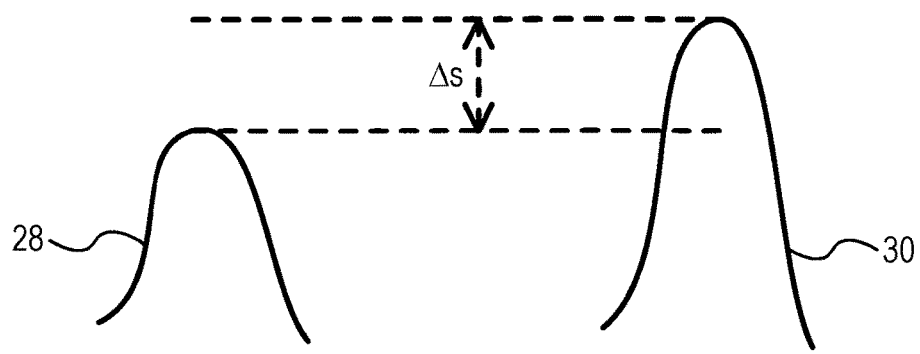
FIG. 9 is a graph illustrating a waveform of biological information.

Hereinafter, FIG. 9 will be referenced to describe Example 2. FIG. 9 illustrates an example of a waveform indicated by biological information.

In Example 2, in the second operation mode, the processor 22 raises the sensitivity of a sensor that measures biological information about the user (for example, the biological information measuring device 12) higher than the sensitivity in the first operation mode. In other words, the processor 22 raises the detection sensitivity in the second operation mode higher than the detection sensitivity in the first operation mode.

A waveform 28 is a waveform indicated by biological information measured in the first operation mode. A waveform 30 is a waveform indicated by biological information measured in the second operation mode. Because the detection sensitivity in the second operation mode is higher than the first operation mode, the amplitude of the waveform 30 is larger than the amplitude of the waveform 28 by an amplitude ΔS.

In Example 2, the first management table is used without using the second management table. In other words, the processor 22 specifies an operation item by referencing the first management table in both the first operation mode and the second operation mode.

For example, suppose that the waveforms 28 and 30 express brain waves. In the period within less than the first time from the standard point in time, the processor 22 specifies an operation item by comparing the waveform 28 measured from the user to each first standard brain wave registered in the first management table according to the first operation mode.

In the case where an operation item is not specified according to the first operation mode for the first time or longer from the standard point in time, the processor 22 specifies an operation item by comparing the waveform 30 measured from the user with raised detection sensitivity to each first standard brain wave registered in the first management table according to the second operation mode.

For example, situations may occur in which biological information of sufficient strength (for example, amplitude) to operate the operation target is not measured from the user because of the user☐s inexperience or the like. In such cases, by switching the operation mode from the first operation mode to the second operation mode, the occurrence of such situations may be reduced or avoided.

EXAMPLE 3

Figure 10:
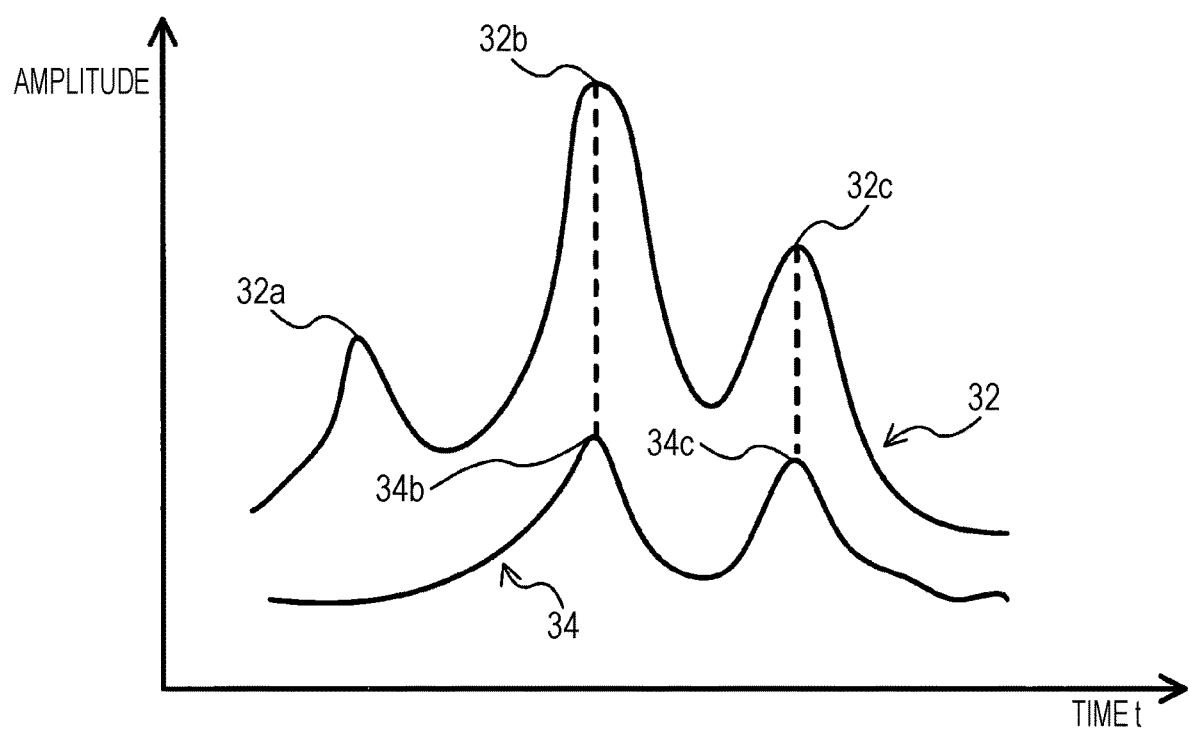
FIG. 10 is a graph illustrating change over time in biological information.

Hereinafter, FIG. 10 will be referenced to describe Example 3. FIG. 10 is a graph illustrating change over time in biological information. The horizontal axis represents time, while the vertical axis represents amplitude.

A waveform 32 is one example of the first standard biological information associated with operation information indicating a certain operation item X. The waveform 32 has three peaks (for example, peaks 32a, 32b, and 32c). The peaks 32a, 32b, and 32c express a feature of the waveform 32.

A waveform 34 is biological information measured from the user. The waveform 34 has two peaks (for example, peaks 34b and 34c). The peaks 34b and 34c express a feature of the waveform 34.

For example, the waveforms 32 and 34 are brain waves. The waveform 32 is one example of the first standard brain wave registered in the first management table. The waveform 34 is a brain wave measured from the user. The waveforms 32 and 34 may also be biological information other than brain waves.

In the first operation mode, the processor 22 operates the operation target according to matching points between the feature of the biological information about the user (for example, a brain wave) and the feature of the first standard biological information. For example, the processor 22 compares the number of peaks in the waveform indicated by the biological information about the user to the number of peaks in the waveform indicated by the first standard biological information, and compares the position on the time axis of each peak in the waveform indicated by the biological information about the user with the position on the time axis of each peak in the waveform indicated by the first standard biological information.

In the second operation mode, the processor 22 operates the operation target even if the number of matching points between the feature of the biological information about the user and the feature of the first standard biological information is less than the number of matching points in the first operation mode.

For example, in the first operation mode, in the case where the number of matching points between the feature of the biological information about the user and the feature of the first standard biological information is equal to or greater than a third threshold, the processor 22 specifies the operation item indicated by the operation information associated with the first standard biological information.

Also, in the second operation mode, in the case where the number of matching points between the feature of the biological information about the user and the feature of the first standard biological information is equal to or greater than a fourth threshold, the processor 22 specifies the operation item indicated by the operation information associated with the first standard biological information. The fourth threshold has a smaller value than the third threshold.

For example, in the period within less than the first time from the standard point in time, the processor 22 compares the brain wave of the user to each first standard brain wave registered in the first management table according to the first operation mode.

For example, suppose that the third threshold is "3". In the case where a brain wave indicating a waveform with three peaks in which the position of each peak corresponds to the position of each of the peaks 32a, 32b, and 32c is measured from the user, the processor 22 specifies the operation item indicated by the operation information associated with the first standard brain wave indicating the waveform 32. In other words, because the number of matching points of the feature is equal to or greater than the third threshold, the processor 22 specifies the operation item indicated by the operation information associated with the first standard brain wave indicated by the waveform 32.

In the case where an operation item is not specified according to the first operation mode for the first time or longer from the standard point in time, the processor 22 compares the brain wave of the user to each first standard brain wave registered in the first management table according to the second operation mode.

For example, suppose that the waveform 34 is measured from the user. The peak 34b of the waveform 34 is a peak corresponding to the peak 32b of the waveform 32, and the peak 34c of the waveform 34 is a peak corresponding to the peak 32c of the waveform 32. Because the number of matching points of the feature is "2", which is less than the third threshold, in the first operation mode, an operation item is not specified on the basis of the waveform 34. In the case where the fourth threshold is "2", the number of matching points of the feature is equal to or greater than the fourth threshold, and therefore the processor 22 specifies the operation item indicated by the operation information associated with the first standard brain wave indicated by the waveform 32.

In addition, the processor 22 may also cause the display device of the UI 18, a display device of a user terminal device, or the like to display the biological information indicating the operation item of the operation target and the biological information about the user juxtaposed with each other. In the example illustrated in FIG. 10, the processor 22 causes the display device to display the waveforms 32 and 34 juxtaposed with each other. The processor 22 may also cause the display device to display the waveforms 32 and 34 overlapping each other. The waveform 32 is biological information for operating the operation target, and may be considered to be biological information that the user treats as a goal. The user is able to control the production of biological information while comparing waveform 34 indicating the user☐s own biological information to the waveform 32 treated as the goal waveform.

In Example 3, the first management table is used without using the second management table. In other words, the processor 22 specifies an operation item by referencing the first management table in both the first operation mode and the second operation mode.

As another example, a second standard brain wave having fewer features (for example, peaks) than the first standard brain wave may be registered in the second management table, and in the second operation mode, an operation item may be specified by using the second management table. For example, a waveform having one fewer peak than the waveform 32 may be registered as the second standard brain wave in the second management table. In the second operation mode, the processor 22 compares the brain wave of the user to each second standard brain wave registered in the second management table, searches for a second standard brain wave having a number of matching points of the feature equal to or greater than the fourth threshold, and specifies the operation item indicated by the operation information associated with the second standard brain wave.

EXAMPLE 4

Figure 11:
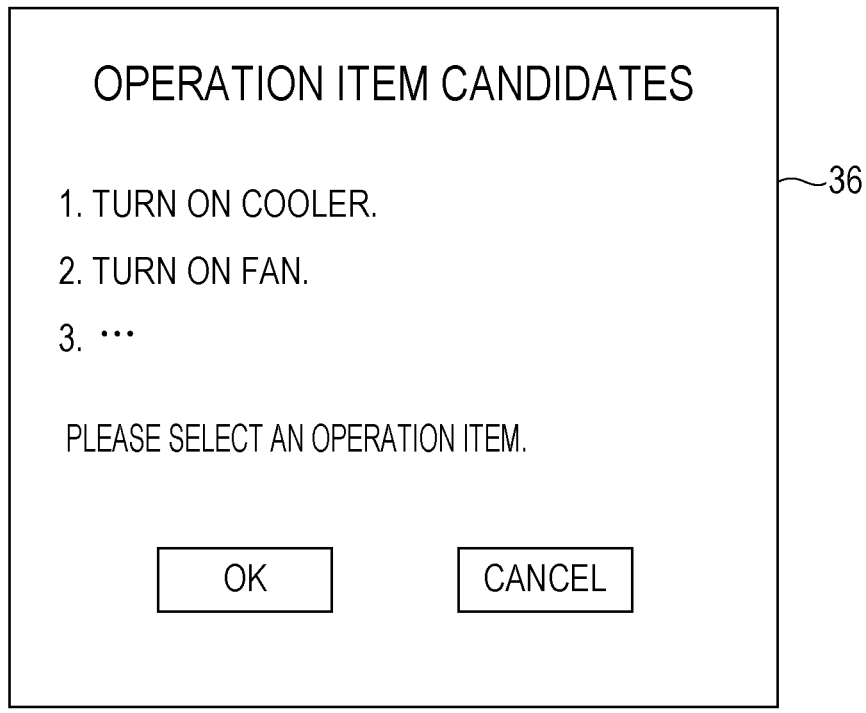
FIG. 11 is a diagram illustrating a screen.

Hereinafter, FIG. 11 will be referenced to describe Example 4. FIG. 11 is a diagram illustrating a screen.

In the case where there are multiple candidates of the operation item indicated by biological information about the user, the processor 22 notifies the user of the multiple candidates. For example, in the case where multiple operation items are specified on the basis of biological information about the user in each of the first operation mode and the second operation mode, the processor 22 notifies the user of the multiple operation items.

For example, as illustrated in FIG. 11, the processor 22 causes the display device of the UI 18, a display device of a user terminal device, or the like to display a screen 36. In the example illustrated in FIG. 11, operation items such as an operation item of "turn on cooler" and an operation item of "turn on fan" are specified, and information indicating these operation items is displayed. Note that the processor 22 may cause a speaker to emit sound expressing the specified multiple operation items while also displaying the screen 36, or without displaying the screen 36.

After notifying the user of the multiple operation items, in the case where an instruction to perform an operation is received from the user through a method other than biological information, the processor 22 operates the operation target according to the instruction. For example, in the case where the user designates an operation item on the screen 36 and gives an instruction to execute the operation item (such as by pressing an "OK" button for example), the processor 22 receives the instruction and operates the operation target according to the instruction. For example, in the case where the user designates the operation item of "turn on cooler" on the screen 36 and gives an instruction to execute the operation item, the processor 22 turns on the cooler of an air conditioner.

After notifying the user of the multiple operation items, in the case where an instruction is received from the user through a method other than biological information within a predetermined time, the processor 22 may operate the operation target according to the instruction. After the predetermined time elapses, the processor 22 does not operate the operation target according to the instruction even if an instruction is received from the user through a method other than biological information.

EXAMPLE 5

Hereinafter, Example 5 will be described.

In the second operation mode, the processor 22 may also execute a process for encouraging the production of biological information indicating an operation item of the operation target. For example, the processor 22 creates an environment enabling the user to produce biological information indicating an operation item more easily. The processor 22 may also execute a process that removes a cause impeding the user from producing biological information indicating an operation item.

Specifically, the processor 22 may cause a speaker to emit music estimated to help people relax, adjust the brightness by dimming lighting equipment or the like, cancel noise, or remove sounds around the user. For example, in the case where the biological information measuring device 12 is a bearable device, the processor 22 may play music estimated to help people relax, cancel noise, or remove ambient sounds.

The process for encouraging the production of biological information indicating an operation item may be executed automatically after the operation mode is switched from the first operation mode to the second operation mode, or may be executed according to an instruction from the user.

Note that the process for encouraging the production of biological information indicating an operation item may also be executed in Examples 1 to 4 described above.

In each of the Examples described above, in the first operation mode, the operation target may also be operated on the basis of only biological information about the user. In this case, in the second operation mode, the processor 22 may control the operation target such that the operation target is operated on the basis of a user operation other than biological information. For example, in the first operation mode, the equipment 14 may be operated on the basis of only a brain wave as an example of biological information. The equipment 14 may operate by receiving the brain wave only, and does not have to receive biological information other than the brain wave or a user instruction. In the second operation, the processor 22 instructs the equipment 14 to receive a user operation other than a brain wave. The equipment 14 follows the instruction and operates to receive a user operation other than a brain wave. For example, the user may operate the equipment 14 by using a terminal device or operate the equipment 14 by using a UI of the equipment 14. Note that the operation target may also be hardware or software other than the equipment 14.

In the case where a brain wave is not measured from the user for a predetermined time or longer, or in the case where a brain wave indicating an operation item is not measured from the user for a predetermined time or longer, the processor 22 may instruct the equipment 14 to receive a user operation other than a brain wave.

In the embodiment above, the term "processor" refers to hardware in a broad sense. Examples of the processor includes general processors (e.g., CPU: Central Processing Unit), dedicated processors (e.g., GPU: Graphics Processing Unit, ASIC: Application Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiment above, and may be changed.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing device comprising:
a processor configured to:
compare biological information about a user to each of a plurality of standard biological information registered in a management system, and search for one or more standard biological information whose difference from the biological information about the user is inside a set tolerance,
operate an operation target according to a first operation mode on a basis of the biological information about the user, and
operate the operation target according to a second operation mode different from the first operation mode on a basis of the biological information about the user in a case where the biological information about the user is being measured and the operation target is not operated according to the first operation mode on the basis of the biological information about the user during a predetermined time,
wherein the biological information about the user includes information indicating an activity of the brain in a form of brain wave information measured about the user,
wherein in a case in which a waveform representing the brain wave information measured about the user and a waveform representing a standard brain wave information that is brain wave information representing an operation item of the operation target are resemble each other at a first level inside the set tolerance, operate the operation target in the first operation mode, and
in a case in which the waveform representing the brain wave information measured about the user and the waveform representing the standard brain wave information resemble each other at a second level that is inside the set tolerance and is lower than the first level, operate the operation target in the second operation mode.

2. The information processing device according to claim 1, wherein
in the first operation mode, the processor is configured to operate the operation target in a case in which a number that a position on a time axis of a predetermined feature of the waveform representing the brain wave information measured about the user matches with a position on the time axis of the predetermined feature of the waveform representing the standard brain wave information is greater than a first threshold, and
in the second operation mode, the processor is configured to operate the operation target in a case in which the number is greater than a second threshold that is smaller than the first threshold.

3. The information processing device according to claim 1, wherein
in the second operation mode, the processor is configured to raise a sensitivity of a sensor that measures the brain wave information about the user higher than in the first operation mode.

4. The information processing device according to claim 1, wherein
in a case where a plurality of candidates of operation items indicated by the brain wave information about the user exist, the processor is configured to notify the user of the plurality of candidates, and after the notification, in a case where an instruction to perform an operation is received from the user through a method other than brain wave information, the processor is configured to operate the operation target according to the instruction.

5. The information processing device according to claim 4, wherein
after the notification, in a case where the instruction to perform the operation is received from the user through the method other than brain wave information within a predetermined notification time, the processor is configured to operate the operation target according to the instruction.

6. The information processing device according to claim 1, wherein
in the second operation mode, the processor is additionally configured to execute a process for encouraging a production of brain wave information indicating the operation item of the operation target.

7. The information processing device according to claim 1, wherein
in the second operation mode, the processor is additionally configured to cause a display to display the standard brain wave information indicating the operation item of the operation target and the brain wave information measured about the user.

8. A non-transitory computer readable medium storing a program causing a computer to execute a process for processing information, the process comprising:
comparing biological information about a user to each of a plurality of standard biological information registered in a management system, and search for one or more standard biological information whose difference from the biological information about the user is inside a set tolerance,
operating an operation target according to a first operation mode on a basis of biological information about the user, and
operating the operation target according to a second operation mode different from the first operation mode on a basis of the biological information about the user in a case where the biological information about the user is being measured and the operation target is not operated according to the first operation mode on the basis of the biological information about the user during a predetermined time,
wherein the biological information about the user includes information indicating an activity of the brain in a form of brain wave information measured about the user,
wherein in a case in which a waveform representing the brain wave information measured about the user and a waveform representing a standard brain wave information that is brain wave information representing an operation item of the operation target are resemble each other at a first level inside the set tolerance, operate the operation target in the first operation mode, and
in a case in which the waveform representing the brain wave information measured about the user and the waveform representing the standard brain wave information are resemble each other at a second level that is inside the set tolerance and is lower than the first level, operate the operation target in the second operation mode.

9. A method comprising:
comparing biological information about a user to each of a plurality of standard biological information registered in a management system, and search for one or more standard biological information whose difference from the biological information about the user is inside a set tolerance,
operating an operation target according to a first operation mode on a basis of biological information about the user, and
operating the operation target according to a second operation mode different from the first operation mode on a basis of the biological information about the user in a case where the biological information about the user is being measured and the operation target is not operated according to the first operation mode on the basis of the biological information about the user during a predetermined time,
wherein the biological information about the user includes information indicating an activity of the brain in a form of brain wave information measured about the user,
wherein in a case in which a waveform representing the brain wave information measured about the user and a waveform representing a standard brain wave information that is brain wave information representing an operation item of the operation target are resemble each other at a first level inside the set tolerance, operate the operation target in the first operation mode, and
in a case in which the waveform representing the brain wave information about the user and the waveform representing the standard brain wave information are resemble each other at a second level that is inside the set tolerance and is lower than the first level, operate the operation target in the second operation mode.

10. The information processing device according to claim 2, wherein the predetermined feature is a waveform peak.

* * * * *